United States Patent [19]

Gipson et al.

[11] 4,101,515

[45] Jul. 18, 1978

[54] 2,2-DIALKYLEPOXIDES

[75] Inventors: Robert Malone Gipson; Ernest Leon Yeakey; William Jennings Peppel, all of Austin, Tex.

[73] Assignee: Texaco Development Corp., New York, N.Y.

[21] Appl. No.: 726,859

[22] Filed: Sep. 27, 1976

Related U.S. Application Data

[62] Division of Ser. No. 560,531, Mar. 20, 1975, abandoned, which is a division of Ser. No. 461,550, Apr. 17, 1974, Pat. No. 3,897,383, which is a division of Ser. No. 263,678, Jun. 16, 1972, Pat. No. 3,835,166.

[51] Int. Cl.$^2$ .................... C08L 63/00; C08G 57/14
[52] U.S. Cl. ...................... 252/182; 260/33.2 EP; 528/103; 526/1
[58] Field of Search ............ 260/2 EP, 47 EP, 2 EC, 260/47 EC

[56] References Cited

U.S. PATENT DOCUMENTS

| | | | |
|---|---|---|---|
| 3,329,652 | 7/1967 | Christie et al. | 260/47 |
| 3,562,213 | 2/1971 | Collis | 260/47 |
| 3,756,984 | 9/1973 | Klaren et al. | 260/47 EC |

OTHER PUBLICATIONS

Lee & Neville, "Handbook of Epoxy Resins", McGraw-Hill, New York, 1967, pp. 13-10 to 13-12.

*Primary Examiner*—Harold D. Anderson
*Assistant Examiner*—E. A. Nielsen
*Attorney, Agent, or Firm*—John R. Kirk, Jr.; James L. Bailey

[57] ABSTRACT

Particular 2,2-dialkylepoxide compositions are provided which are characterized by their novel structure, their liquidity at room temperature and by their unique applicability to a variety of uses.

2 Claims, No Drawings

2,2-DIALKYLEPOXIDES

This is a division, of application Ser. No. 560,531 filed Mar. 20, 1975, and now abandoned, which in turn is a division of application Ser. No. 461,550 filed Apr. 17, 1974, now U.S. Pat. No. 3,897,383, which in turn is a division of application Ser. No. 263,678, filed June 16, 1972, now U.S. Pat. No. 3,835,166.

This invention relates to novel 2,2-dialkylepoxide compositions which exhibit unusual characteristics, such as liquidity at room temperature. The compositions of this invention are particularly suited for improving, at either low or high temperatures, the physical characteristics of various resinous polymers including polyvinyl chloride resins, polyureas, and polyurethanes.

Certain of our compositions demonstrate advantageous utilization as epoxy resin reactive diluents. Further, our compositions can be suitably employed for preparing novel metal corrosion inhibitors, such as described in copending application Ser. No. 263,552, filed at even date herewith, entitled "Amino Alcohols" by Robert M. Gipson.

Heretofore, a wide variety of catalytic materials, such as the organic hydroperoxides, peracids, hydrogen peroxide, transition metals, combinations of the foregoing, and the like, have been employed to oxidize ethylenically unsaturated compounds to provide olefin epoxides. Typical starting olefinic material included the aliphatic linear olefins, such as the alpha-olefins and internal olefins. Exemplary are ethylene, propylene, heptene, and the like. A few methyl substituted lower alpha-olefins, such as methyl pentenes and methyl hexenes have also been employed.

The epoxides of ethylene, propylene and butene are recognized as chemical commodities. Although some high molecular weight linear epoxides have heretofore been prepared, these epoxides are still generally considered as development products.

The epoxidation of olefins is typically represented by the following U.S. Pat. Nos. 3,642,834; 3,642,833; 3,642,832; 3,489,775; 3,351,635; 3,350,422; and 3,293,269.

According to our invention, novel 2,2-dialkylepoxide compositions are provided which correspond to the following representative formula:

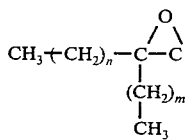

wherein $n$ and $m$, individually, represent integers in the range of 3 to 21 and the sum of $n$ and $m$ is an integer in the range of 8 to 24. Preferred 2,2-dialkylepoxide compositions of this invention are represented by the above formula wherein $n$ and $m$, individually, are integers in the range of 3 to 11 and wherein the sum of $n$ and $m$ is an integer in the range of 14 to 24.

The subject epoxides can be prepared using conventional epoxidation catalysts and conditions by employing the particular vinylidene olefins represented by the following formula:

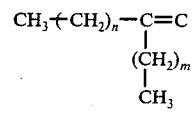

wherein $n$ and $m$, individually, represent integers in the range of 3 to 21 and the sum of $n$ and $m$ is an integer in the range of 8 to 24. Preferred olefin compositions are represented by the above formula wherein $n$ and $m$, individually, are integers in the range of 3 to 11 and the sum of $n$ and $m$ is an integer in the range of 14 to 24.

The above represented 2,2-dialkylepoxide compositions of this invention are liquids at room temperature and thus all of our novel epoxides have freezing points (melting points) below 25° C. The fact that our preferred epoxide compositions, i.e., those higher molecular weight epoxides containing in the range of 18 to 28 carbon atoms per molecule, are liquid at room temperature is indeed surprising. In comparison, an epoxide composition of this invention which contains 28 carbon atoms per molecule is liquid at room temperature while the prior art epoxides, such as one prepared from normal alpha-olefins containing only 18 carbon atoms, is a solid at room temperature. Likewise, the lower molecular weight epoxides of this invention, i.e., those containing in the range of about 12 to 17 carbon atoms per molecule inclusive, possess freezing points, i.e., melting point values, far below any epoxides heretofore known.

The advantages of an epoxide which is liquid at room temperature are obviously many and varied. Our epoxide compositions can be easily handled and utilized in a variety of applications and reactions advantageously.

The outstanding characteristics of our composition enable easy admixture with various polymeric materials and when so admixed provide an improved polymeric material which has substantially improved characteristics particularly at high and low temperatures.

Further distinguishing aspects of our novel compositions will be further described in the examples which follow.

The vinylidene olefin starting materials, as heretofore depicted, can be prepared by dimerizing alphaolefins, e.g., alkyl-CH=CH$_2$, and mixtures of alpha-olefins. For example, a mixture of C$_6$ to C$_{10}$ alpha-olefins can be used in a process, such as representatively described in U.S. Pat. No. 2,695,327. The dimerization reaction can generally be conducted using temperatures in the range of about 160° to 270° C and at pressures from atmospheric to about 10,000 psig. Catalyst concentrations of aluminum, usually as trialkylaluminum, are in the range of about 0.01 to 5.0 wt. % of the olefin feed and can be employed to convert the alpha-olefin to the particular vinylidene olefin starting materials of this invention.

The alpha-olefins can be provided via the conventional conversion of ethylene by a combined growth displacement reaction using Ziegler-type polymerization catalyst, such as triethylaluminum.

Vinylidene olefins, such as, for example, 2-hexyldecene-1; 2-butyloctene-1; or 2-octyleicosene-1 are representative of the olefins that can be epoxidized to provide the unique compositions of this invention.

Suitable epoxidation reagents include the conventional materials of the prior art. Organic and inorganic peracids, such as perbenzoic, chloroperbenzoic, perchloric, persulfuric, performic, perproprionic, permanganic, perchromic, peracetic, pernitric, percarbonic, and the like, are exemplary.

Further, mixtures of carboxylic acids and hydrogen peroxide can be suitably employed. Exemplary carboxylic acids are formic, acetic, propionic, trifluoroacetic, and trichloroacetic acid. Mineral acids, such as sulfuric or strong acid ion exchange resins, can be employed as catalysts, if desired.

It is generally preferred that an excess of hydrogen peroxide be employed to insure a complete conversion but lesser amounts, of course, can be used. The carboxylic acid will be used in catalytic or stoichiometric quantities. Olefins can be contacted with the epoxidizing mixture in one step only, or multiple steps can be utilized to advantage. Strong acid catalysts, e.g., $H_2SO_4$ are ordinarily used with $H_2O_2$ carboxylic acid mixes.

Solvents may be employed when using mixtures of carboxylic acids and hydrogen peroxide or when the preformed percarboxylic acids, i.e., peracids, are employed. Generally, in such reactions a temperature in the range of 0° to 150° C, preferably a temperature in the range of 20° to 80° C, is conventionally employed. Paraffinic, aromatic or chlorinated hydrocarbons, ethers, and the like, that are inert, can be suitably employed as solvents. Benzene, hexane, chlorobenzene, and the like, are exemplary.

Hydroperoxides can also be suitably employed and are often used in conjunction with a cocatalyst. In such a procedure the olefin is contacted with a hydroperoxide, such as t-butylhydroperoxide, cumylhydroperoxide, cyclohexylhydroperoxide, and the like, in the presence of the cocatlyst.

Cocatalysts are typically transition metal or boron compounds. Some of the most useful ones are those containing tungsten, molybdenum or vanadium. Solvents are generally not employed with the hydroperoxides but alcohols and other inert solvents heretofore mentioned can be employed if desired. When the hydroperoxides are employed in conjunction with such a cocatalyst, a reaction temperature of about 20° to 150° C, preferably a temperature in the range of about 60° to 120° C, is conventionally employed.

The catalysts and conditions described in the heretofore named prior art patents are suitable and are hereby incorporated by reference thereto. As will be understood by those skilled in the epoxidation art, the conditions of the epoxidation reaction can vary widely according to the process and catalyst employed. Generally temperatures are in the range of about 0° to 150° C. Generally pressures in the above process are suufficient to maintain the reaction mixture essentially in the liquid phase. Reaction times can vary widely and generally are from about a minute to many hours. Usually, times from about 10 minutes to 10 hours are suitable. The mol ratio of the olefin to the peracid, hydroperoxide, et al is generally in the range of about 0.5:1 to 100:1. The cocatalysts when employed are generally based on the amount of hydroperoxides used and generally are from about .00001 mol to about 0.03 mol of cocatalysts per mol of hydroperoxide. Alkali metals or alkaline earth compounds, such as sodium hydroperoxide or calcium hydroxides can also be conventionally employed with the metallic epoxidation cocatalyst.

Regardless of the method employed, it is usually preferred to insure as complete a conversion of the olefin as is possible in order that the recovery of the epoxide consists essentially of the removal of the solvents, epoxidizing reagent(s), and reagent products. Distillation and selective absorption techniques can be employed in product recovery.

The foregoing discussion and description is further illustrated by the following examples which depict preparation of various of our novel epoxide compositions and demonstrate many of the distinguishing aspects of this invention. The compositions prepared in the following examples were verified by nuclear magnetic resonance, infrared, and gas chromatography analysis. The examples presented are not to be interpreted as limiting the scope of the foregoing discussion nor as a limitation on the materials therein exemplified.

EXAMPLE I

An equimolar mixture of decene-1 and dodecene-1 with 0.4 wt. % triethylaluminum was passed through a tubular reactor operated at a temperature of 230° C and a pressure of 500 psig to give a mixture of unreacted starting materials and olefin products containing 20, 22 and 24 carbon atoms per molecule. Following hydrolysis and distillation of the reaction mixture, a 98 wt. % fraction of said olefins containing approximately 80.2 wt. % of a mixture of 2-decyldodecene-1 and 2-octyltetradecene-1 was recovered.

One hundred grams of the recovered $C_{22}$ olefin fraction was added to a well-stirred flask immersed in a 70° C water bath. One hundred grams of benzene, 31.5 grams of a 70% hydrogen peroxide solution and 0.18 gram sulfuric acid was added thereto, with cooling, to maintain the temperature below 75° C. Four and nine-tenths grams of formic acid was then added over a twenty-minute period. The reaction mixture was held at about 70° C for an additional 80 minutes, then poured into 300 ml of water. The organic layer was separated, washed twice with 200 ml of water and dried over sodium sulfate. It was then filtered and the benzene removed in vacuo to give 105 grams of a water white oil. This product was analyzed by gas chromatography and showed to be 96.7 wt. % $C_{22}$ epoxides. Nuclear magnetic resonance spectra and infrared analysis were consistent with the material consisting predomnantly of a mixture of 2-decyl-1,2-epoxydodecane and 2-octyl-1,2-epoxytetradecane.

EXAMPLE II

A solution of triethylaluminum (1.1% by weight) in octene-1 was passed through a tubular reactor operated at 234° C and 3,500 psig to give a mixture of unreacted octene and $C_{16}$ olefins. Hydrolysis and distillation of the product gave a fraction containing 99.9% $C_{16}$ olefins of which 88% was 2-hexyldecene-1.

A well stirred 2-liter flask was charged with 355 grams of the $C_{16}$ olefin fraction and 445 grams benzene. The mixture was heated to 70° C and 135 grams of 35% hydrogen peroxide, 0.54 gram sulfuric acid and 20 grams formic acid were added thereto. The temperature was maintained at 67° to 72° C for 100 minutes, then the reaction mixture was poured into 500 ml of water. The organic layer was washed twice with 500 ml of water and recharged to the reaction flask. The mixture was heated to 70° C and 140 grams of 50% hydrogen peroxide, 0.54 gram sulfuric acid and 20 grams formic acid were added thereto. The reaction temperature was maintained at 68° to 72° C for 100 minutes. The reaction mixture was transferred to a separatory funnel and the aqueus layer was removed. The organic layer was washed twice with water, dried over sodium sulfate, filtered, and the benzene removed in vacuo to give 362 grams water white liquid. Gas chromatography showed the product to be 96% $C_{16}$ epoxide. Elemental analysis showed the following: calculated for $C_{16}H_{32}O$; C = 79.93%, H = 13.42%; found; C = 79.92%; H = 13.94%. The infrared and nuclear magnetic resonance spectra were consistent with the product being predominately 2-hexyl-1,2-epoxydecane.

EXAMPLES III–VII

The following exemplary epoxides are representative of other epoxides that were prepared by the methods similar to those reported in the preceding examples: 2-butyl-1,2-epoxyoctane; a mixture of 2-hexyl-1,2-epoxyoctane and 2-butyl-1,2-epoxydecane; a mixture of 2-octyl-1,2-epoxydecane and 2-hexyl-1,2-epoxydodecane; 2-octyl-1,2-epoxydodecane; 2-decyl-1,2-epoxytetradecane; and 2-dodecyl-1,2-epoxyhexadecane.

EXAMPLE VIII

A 2-liter flask was charged with 100 g. of a $C_{14}$ olefin mixture containing 2-butyldecene-1 and 2-hexyloctene-1 (prepared by methods similar to those of Examples I and II), and one liter of chloroform. This solution was stirred vigorously while adding 130 g. m-chloroperbenzoic acid (85%) at such a rate to maintain the temperature at 35°–40° C. The addition was complete in two hours and the reaction mixture was stirred and heated an additional two hours at 35°–40° C, then allowed to stand overnight. The reaction mixture was filtered. The filtrate was washed twice with 500 ml portions of 10% sodium hydroxide and once with 500 ml water. The washed solution was dried over sodium sulfate, filtered and the solvent removed in vacuo to give 101 g. liquid product. Gas chromatography showed that the product was 89% $C_{14}$ epoxides. The nuclear magnetic resonance spectrum was consistent with the product being predominantly a mixture of 2-butyl-1,2-epoxydecane and 2-hexyl-1,2-epoxyoctane.

The 2,2-dialkyl-1-epoxides of this invention are liquid at room temperature. The following examples demonstrate some further aspects and advantages of these epoxides which have such very low pour point characteristics.

Epoxide compositions of this invention were admixed with polyvinylchloride formulations at room temperature. The following Examples IX and X demonstrate preparation of improved polyvinylchloride resin formulations, and accordingly demonstrate the improved low temperature flexibility and increased heat stability provided the polyvinylchloride formulations by the inclusion of the subject epoxide compositions.

EXAMPLE IX

Polyvinylchloride formulations containing 100 parts polyvinylchloride resin, 50 dioctyl phthalate, 0.5 part epoxy resin and from 0 to 15 parts by weight of the subject epoxide compositions were tested for heat stability at 177° C.

When 2-octyl-1,2-epoxydodecane and 2-octyl-1,2-epoxytetradecane were included in such formulations the time to failure of the polyvinylchloride formulation was increased over formulations containing neither of the epoxides. The increased time to failure, by using the subject epoxides of this invention was in the range of 25 to 75%.

EXAMPLE X

Polyvinylchloride formulations were prepared, as in Example IX, and the low temperature flexibility of these formulations was determined at the temperatures indicated in Table 1. The reported temperatures are the temperature in which the torque resistance of the sample equaled 135,000 dyne-cm. For control purposes, 15 parts of a linear alpha epoxide was substituted in the formulation in lieu of the subject epoxides. The control test was impossible to complete because of the incompatibility of the linear alpha epoxide.

TABLE 1

| Parts epoxide | [1]T135,000 ° C | | | |
|---|---|---|---|---|
| | 0 | 5 | 10 | 15 |
| 2-octyl-1,2-epoxydodecane | −20° | −24° | −29° | −32° |
| 2-octyl-1,2-epoxytetradecane | −20° | −25° | −27° | −27° |

[1]Temperature at which torque resistance of the sample = 135,000 dyne-cm.

Accordingly, from about 1 to 25 parts, or even greater amounts if desired, preferably about 5 to 20 parts, of the epoxide compositions of this invention can be employed per 100 parts of polyvinylchloride resin to improve the physical characteristics of polyvinylchloride resin formulations.

EXAMPLE XI

Two sprayable polyurea-polyurethane elastomer systems which contained 15% by weight of 2-octyl-1,2-epoxydodecane and 2-octyl-1,2-epoxytetradecane, respectively, were tested for their low temperature characteristics. The low temperature properties were determined by chilling a sprayed film sample and bending it double. In control runs, when none of the subject epoxides was added to the same films, the films cracked or stressed at an average temperature of −10° C. The films containing the subject epoxides did not crack or stress even at −50° C. The subject epoxides can be employed with polyurethanes or polyureas in amounts as previously indicated for polyvinylchlorides to improve the characteristics thereof.

EXAMPLE XII

As herein indicated, a unique characteristic of the novel 2,2-dialkyl-1,2-epoxides of this invention are the very low freezing points. The freezing points of some of our epoxides are reported in the following table along with the corresponding linear alpha epoxides of the prior art.

TABLE 2

| | Freezing Point ° C (m.p.) | |
|---|---|---|
| Total Carbon No. | Type I Epoxide $(R-C\underset{R'\ \ O}{\overset{\diagdown\ \ \diagup}{—}}CH_2)$ | Linear Alpha Epoxide |
| 12 | −50° | −8° |
| 14 | −50° | |
| 16 | −50° | 12–14° |
| 18 | −33 to −36° | 28–29° |
| 20 | −22 to −24° | 40° |
| 22 | −4° | |
| 24 | 4–5° | |

EXAMPLE XIII

It is recognized that commercial epoxy resins, such as the glycidyl ethers of Bisphenol A and/or higher polymers, are useful materials finding wide and diversed applications. However, the high viscosity of these resins often can be a definite disadvantage in many applications. It has been common practice to employ reactive diluents, such as butylglycidyl ether or phenylglycidyl ether to reduce the high viscosity of such resins. Those epoxide compositions of this invention containing 12 to 14 carbon atoms per molecule have been found exceptionally valuable as reactive diluents for epoxy resins. Accordingly, they can be employed in amounts ranging from about 1 to 25 wt. %, preferably about 5 to 20 wt. % of the subject epoxide compositions, based upon the weight of the epoxy resin, to reduce the viscosity of the epoxy resin.

In demonstration of the foregoing various mixtures of 2-butyl-1,2-epoxyoctane and a commercial epoxy resin (a mixture of diglycidyl ether of Bisphenol A, and higher polymers, having an equivalent weight of 193) were made and the viscosity of the solution then measured at 25° C using a Brookfield viscometer. Viscosity measurements at various concentrations are reported in Table 3. The gel time of a 100-gram sample of the 12% solution reported in Table 3 was 29.5 minutes when cured with 12 grams of diethylenetriamine. A satisfactory polymer was obtained. As a control, 15 parts of normal $C_{12}$ alpha olefin epoxide was employed in lieu of the subject epoxides. The test was unsatisfactory due to the incompatibility of the normal $C_{12}$ alpha epoxide.

TABLE 3

| Wt. % 2-butyl-1,2-epoxyoctane | 0 | 5 | 10 | 12 | 15 |
| --- | --- | --- | --- | --- | --- |
| Viscosity, cps at 25° C | 12,300 | 3,215 | 1,108 | 887 | 548 |

The preceding examples can be repeated with similar success by substituting the generically and specifically described reactants and conditions of this invention for those specifically employed in the examples.

It will be evident to those skilled in the art that various modifications of this invention can be made or followed in light of the discussion and disclosure herein set forth without departing from the spirit of the scope thereof.

We claim:

1. A process for reducing the viscosity of epoxy resins comprising admixing therewith an epoxide compound of the following formula:

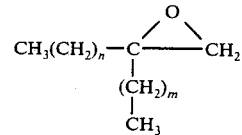

wherein $n$ and $m$, individually, are integers in the range of 3 to 7 and the sum of $n$ and $m$ is an integer in the range of 8 to 10; and wherein from about 1 to 25 parts by weight of said epoxide is employed per 100 parts by weight of said epoxy resin.

2. The process of claim 1 wherein from about 5 to 15 parts by weight of said epoxide composition is employed per 100 parts by weight of said epoxy resin.

* * * * *